(12) United States Patent
Perakes et al.

(10) Patent No.: US 7,870,925 B2
(45) Date of Patent: Jan. 18, 2011

(54) SYSTEM AND METHOD FOR MANAGING A POWERTRAIN IN A VEHICLE

(75) Inventors: Andreas E. Perakes, Canton, MI (US); Ashok Rodrigues, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 831 days.

(21) Appl. No.: 11/276,256

(22) Filed: Feb. 21, 2006

(65) Prior Publication Data

US 2007/0193808 A1 Aug. 23, 2007

(51) Int. Cl.
*B60K 17/356* (2006.01)
(52) U.S. Cl. .............. 180/243; 180/6.25; 180/6.285
(58) Field of Classification Search ............ 180/242, 180/243, 65.2, 65.3, 65.4, 65.25, 65.265, 180/65.28, 65.285, 65.31; 701/22, 81, 89
See application file for complete search history.

(56) References Cited

U.S. PATENT DOCUMENTS

| | | | | |
|---|---|---|---|---|
| 5,176,213 A | * | 1/1993 | Kawai et al. ............... 180/243 |
| 5,301,764 A | * | 4/1994 | Gardner ...................... 180/65.2 |
| 5,495,906 A | * | 3/1996 | Furutani ..................... 180/65.2 |
| 6,059,064 A | * | 5/2000 | Nagano et al. .............. 180/243 |
| 6,119,799 A | * | 9/2000 | Morisawa et al. .......... 180/65.2 |
| 6,435,296 B1 | * | 8/2002 | Arai ............................ 180/243 |
| 6,484,832 B1 | * | 11/2002 | Morisawa et al. .......... 180/65.2 |
| 6,793,034 B2 | | 9/2004 | Raftari et al. |
| 2003/0037977 A1 | * | 2/2003 | Tatara et al. ................ 180/65.3 |
| 2004/0200654 A1 | * | 10/2004 | Hatsuda et al. ............. 180/243 |
| 2005/0103551 A1 | * | 5/2005 | Matsuno ..................... 180/243 |
| 2006/0201730 A1 | * | 9/2006 | Kaneko et al. .............. 180/243 |

* cited by examiner

*Primary Examiner*—Anne Marie M Boehler
(74) *Attorney, Agent, or Firm*—David B. Kelley; Brooks Kushman P.C.

(57) ABSTRACT

A system and method for managing a powertrain in a vehicle determines a number of vehicle conditions, and compares them to predetermined conditions to determine whether a secondary axle of the vehicle should be automatically connected to or disconnected from the powertrain. In general, if the speed of the vehicle is above some predetermined speed threshold, the secondary axle is disengaged to increase fuel economy. Conversely, if the speed of the vehicle is below some predetermined threshold, the secondary axle is typically engaged to help maximize the capture of regenerative braking energy during a braking event. Additional vehicle conditions may be examined, and exceptions to the general rule utilized, to further enhance the control strategy.

10 Claims, 3 Drawing Sheets

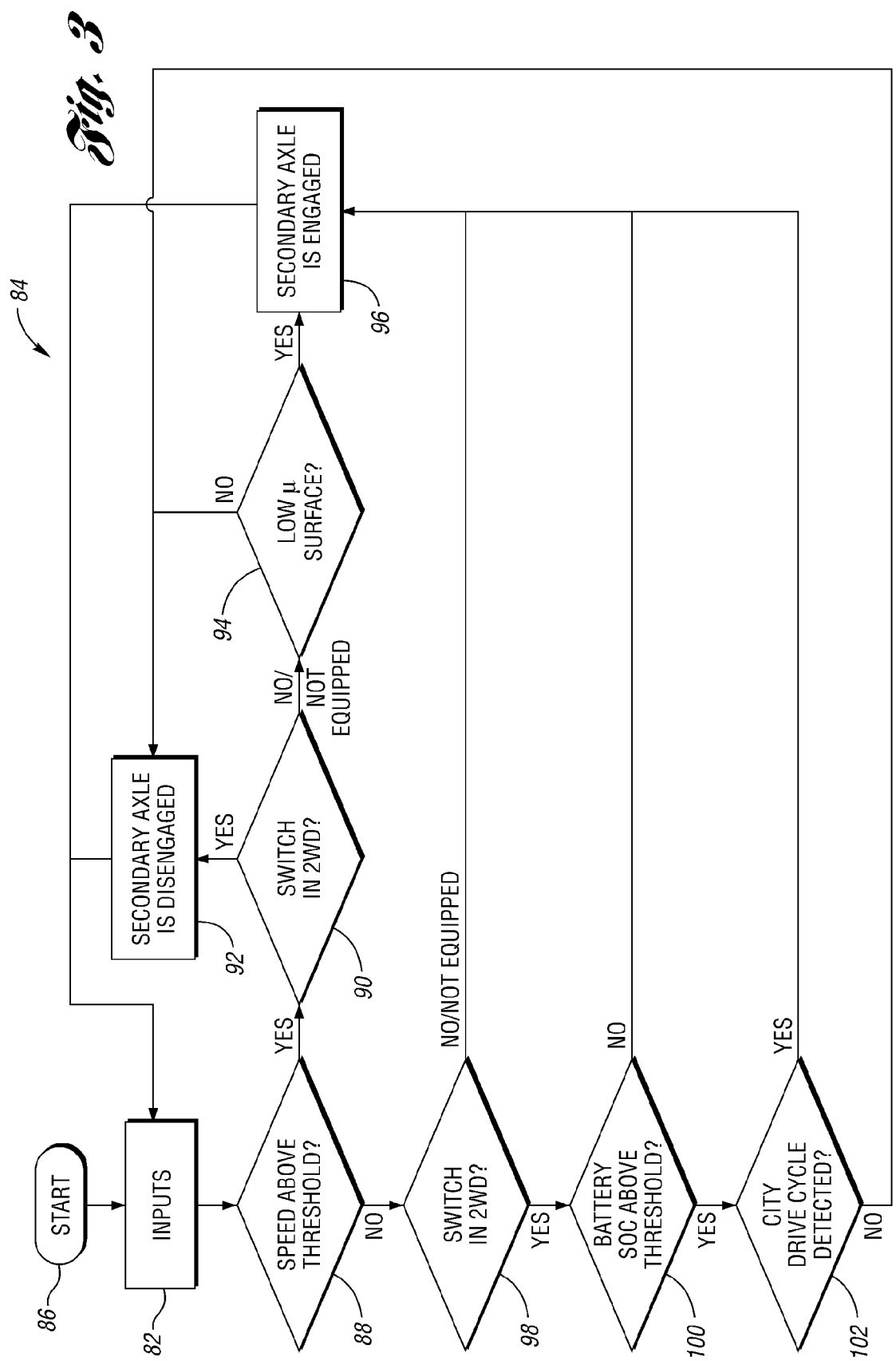

SYSTEM AND METHOD FOR MANAGING A POWERTRAIN IN A VEHICLE

BACKGROUND OF THE INVENTION

1. Field of the Invention

The present invention relates to a system and method for managing a powertrain in a vehicle.

2. Background Art

Although four-wheel-drive vehicles may provide much better traction than their two-wheel-drive counterparts, four-wheel-drive vehicles typically sacrifice fuel economy. To help mitigate the increase in fuel consumption in four-wheel-drive vehicles, driveline disconnect devices may be used to selectively disconnect one of the axles, temporarily allowing the vehicle to effectively operate in a two-wheel-drive mode. Thus, the use of driveline disconnects helps a vehicle to regain some of the overall fuel economy that may otherwise be lost because of its operation in a four-wheel-drive mode.

Another way that fuel economy in vehicles is being increased is through the use of hybrid electric vehicles (HEV's). These vehicles typically have a moderately sized internal combustion engine and one or more electric motors, each of which may be capable of providing torque to drive the vehicle. One of the ways in which HEV's increase fuel economy is through the use of regenerative brake energy recovery. That is, one or more of the electric motors may provide resistance to slow the vehicle. The motor or motors are effectively driven as generators, outputting energy to a storage device, such as a battery. The energy stored in the battery is later used to drive the motors during certain vehicle operating conditions.

In the case of an HEV that is a also a four-wheel-drive vehicle, the use of driveline disconnects is at odds with the regenerative braking system. This is because an axle needs to be connected to the powertrain in order for that axle to participate in the recovery of braking energy. If the driveline is connected to the powertrain, however, fuel economy is reduced because all four wheels are being used to drive the vehicle.

Therefore, there is a need for a system and method for managing a powertrain in a vehicle such that under certain vehicle conditions only one set of wheels is connected to the vehicle powertrain. This helps to increase the overall fuel economy of the vehicle. Under certain other vehicle conditions, in particular, when regenerative braking is desired, or when the vehicle is in a four-wheel-drive mode, both sets of wheels are connected to the powertrain, thereby maximizing the amount of regenerative braking energy that can be collected.

SUMMARY OF THE INVENTION

One of the advantages of the present invention is that it provides a system and method for selectively connecting and disconnecting a set of drive wheels from a powertrain in an HEV so that both sets of wheels are connected to the powertrain during regenerative braking, but at certain other times one set of wheels is automatically disconnected from the powertrain to provide increased fuel economy.

The invention also provides a method for managing a powertrain in a vehicle including a front drive wheel and a rear drive wheel. The vehicle is operable in at least a first driving mode in which the front and rear drive wheels are selected to drive the vehicle. At least one of the drive wheels has a changeable connection status to the powertrain such that it is selectively connectable to and disconnectable from the powertrain. The method includes determining at least one vehicle condition, including at least one of a speed of the vehicle and whether the vehicle is operating in the first driving mode. At least one of the determined vehicle conditions is compared to a respective predetermined condition, and the connection status of at least one of the drive wheels is changed based on the comparison of the at least one determined vehicle condition to its respective predetermined condition.

The invention further provides a method for managing a powertrain in a vehicle. The powertrain includes an electric motor arrangement operable to provide torque to at least a first pair of drive wheels proximate one end of the vehicle. The vehicle includes a second pair of drive wheels proximate another end of the vehicle. The second pair of drive wheels has a changeable connection status to the powertrain such that it is selectively connectable to and disconnectable from the powertrain. The vehicle further includes a selection device for selectively placing the vehicle in a four-wheel-drive mode or a two-wheel-drive mode. The method includes determining a speed of the vehicle and determining whether the vehicle is in the two-wheel-drive mode or the four-wheel-drive mode. The second pair of drive wheels is disconnected from the powertrain when it is determined that the speed of the vehicle is above a predetermined speed threshold, the vehicle is in the two-wheel-drive mode, and the second pair of drive wheels is connected to the powertrain.

The invention also provides a system for managing a powertrain in a vehicle. The powertrain includes an electric motor arrangement operable to provide torque to at least a first wheel proximate one end of the vehicle. The vehicle includes a second drive wheel proximate another end of the drive wheel and a power supply for storing electrical energy and for providing electrical energy to the motor arrangement. The vehicle is operable in at least a first driving mode in which the first and second drive wheels are selected to drive the vehicle. The system includes a disconnect disposed between the second drive wheel and the powertrain. The disconnect is operable to selectively connect the second drive wheel to, and disconnect the second drive wheel from, the powertrain. A control system includes at least one controller, and it is in communication with the disconnect. The control system is configured to determine a speed of the vehicle and whether the vehicle is operating in the first driving mode. The control system is further configured to effect operation of the disconnect to disconnect the second drive wheel from the powertrain when: the speed of the vehicle is above a predetermined speed threshold, the vehicle is not operating in the first driving mode, and the second drive wheel is connected to the powertrain.

BRIEF DESCRIPTION OF THE DRAWINGS

FIG. 3 is a flow chart illustrating a method in accordance with one embodiment of the present invention.

DETAILED DESCRIPTION OF THE PREFERRED EMBODIMENT(S)

Figure 1:
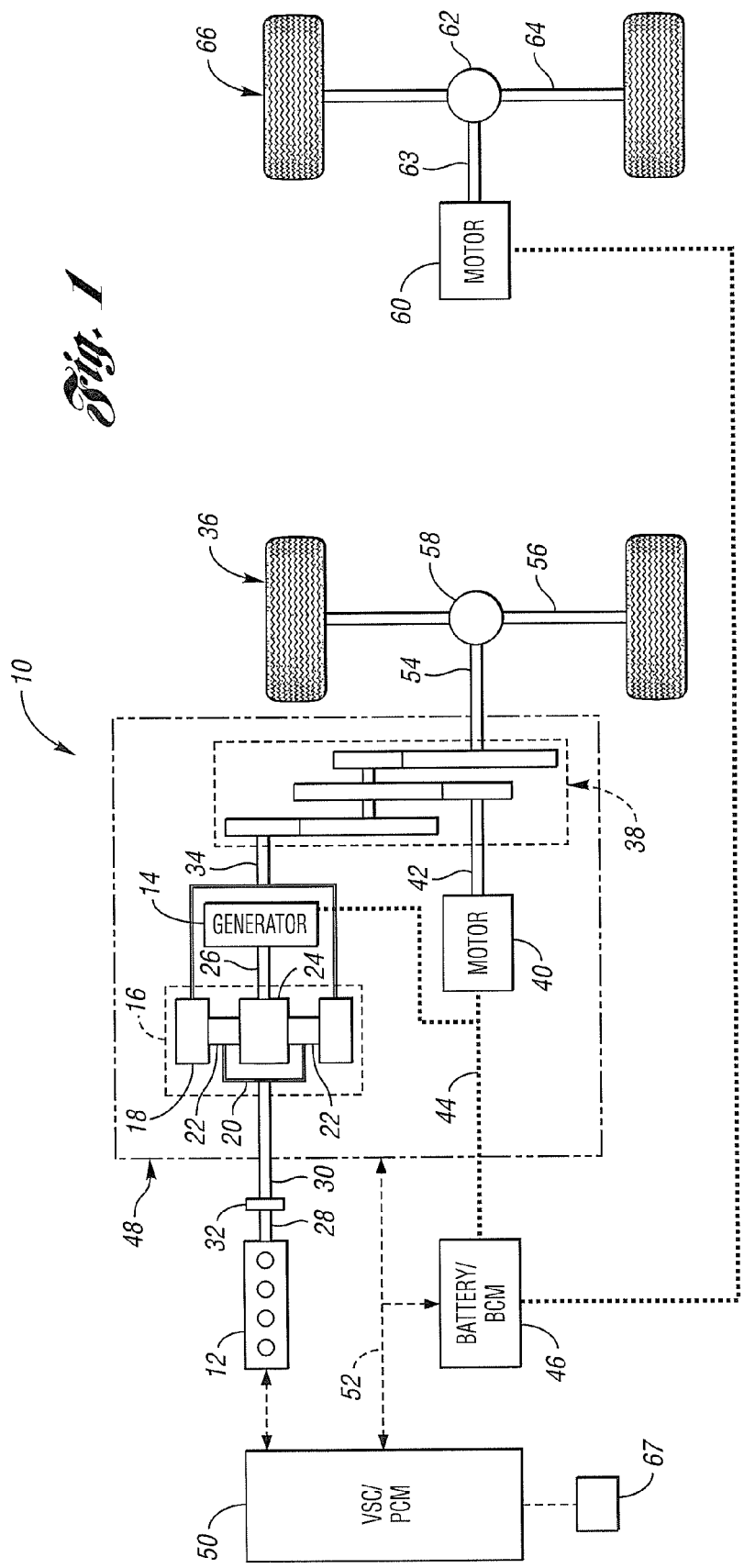
FIG. 1 is a schematic representation of a vehicle having a powertrain to be controlled by a system and method of the present invention.

FIG. 1 shows a schematic representation of a vehicle 10 including an engine 12 and an electric machine, or generator 14. The engine 12 and the generator 14 are connected through a power transfer unit, which in this embodiment is a planetary gear set 16. Of course, other types of power transfer units, including other gear sets and transmissions, may be used to connect the engine 12 to the generator 14. The planetary gear set includes a ring gear 18, a carrier 20, planet gears 22, and a sun gear 24.

The generator 14 can also be used as a motor, outputting torque to a shaft 26 connected to the sun gear 24. Similarly, the engine 12 outputs torque to a crankshaft 28, which is connected to a shaft 30 through a passive clutch 32. The clutch 32 is used to ensure that the crankshaft 28 only rotates in one direction. The shaft 30 is connected to the carrier 20 of the planetary gear set 16. Having the generator 14 operatively connected to the engine 12, as shown in FIG. 1, allows the speed of the engine 12 to be controlled by the generator 14.

The ring gear 18 is connected to a shaft 34, which is connected to a first set of vehicle drive wheels, or primary drive wheels 36, through a second gear set 38. The vehicle 10 includes a second electric machine, or motor 40, which can be used to output torque to a shaft 42. Other vehicles within the scope of the present invention may have different electric machine arrangements, such as more or fewer than two electric machines. In the embodiment shown in FIG. 1, the electric machine arrangement—i.e., the motor 40 and the generator 14—can both be used as motors to output torque. Alternatively, each can also be used as a generator, outputting electrical power to a high voltage bus 44 and to an energy storage device, or battery 46.

The battery 46 is a high voltage battery that is capable of outputting electrical power to operate the motor 40 and the generator 14. As shown in FIG. 1, the battery 46 includes its own controller, or battery control module (BCM). Other types of energy storage devices and/or output devices can be used with a vehicle, such as the vehicle 10. For example, a device such as a capacitor can be used, which, like a high voltage battery, is capable of both storing and outputting electrical energy. Alternatively, a device such as a fuel cell may be used in conjunction with a battery and/or capacitor to provide electrical power for the vehicle 10.

As shown in FIG. 1, the motor 40, the generator 14, the planetary gear set 16, and a portion of the second gear set 38 may generally be referred to as a transmission 48. To control the engine 12 and components of the transmission 48—i.e., the generator 14 and motor 40—a control system, shown generally as controller 50, is provided. As shown in FIG. 1, the controller 50 is a vehicle system controller/powertrain control module (VSC/PCM). Although it is shown as a single controller, it may include multiple controllers. For example, the PCM portion of the VSC/PCM 50 may be software embedded within the VSC/PCM 50, or it can be a separate hardware device.

A controller area network (CAN) 52 allows the VSC/PCM 50 to communicate with the transmission 48 and the BCM of the battery 46. Just as the battery 46 includes a BCM, other devices controlled by the VSC/PCM 50 may have their own controllers. For example, an engine control unit (ECU) may communicate with the VSC/PCM 50 and may perform control functions on the engine 12. In addition, the transmission 48 may include one or more controllers, such as a transmission control module (TCM), configured to control specific components within the transmission 48, such as the generator 14 and/or the motor 40. Some or all of these various controllers can make up a control system contemplated by the present invention.

The transmission 48 outputs torque to an output shaft 54, which is connected to a first axle 56 through a first differential 58. A motor 60 is connected to a second differential 62 through a shaft 63. The second differential 62 is connected to a second axle 64, which is driven by the motor 60, and in turn, drives a second set of wheels, or secondary drive wheels 66.

In other embodiments, the front and rear differentials may be connected by a drive shaft having a disconnect clutch connected to it. In this way, the powertrain connected to the primary drive wheels can also provide torque to the secondary drive wheels. For example, in the vehicle 10, the powertrain connected to the primary drive wheels 36 includes the driveline system and power sources—e.g., the engine 12, the generator 14, and the motor 40. If a drive shaft were disposed between the differentials 58, 62, it could be used to transmit torque from the engine 12, or other primary power sources, to the secondary drive wheels 66.

In the embodiment shown in FIG. 1, the vehicle 10 is equipped with a selective four-wheel-drive mode. Specifically, the secondary drive wheels 66 can be selectively connected to and disconnected from a powertrain, which includes the motor 60 and the shaft 63. The vehicle 10 has a selection device 67, which allows the vehicle operator to manually choose a first or second driving mode, for example, a four-wheel-drive mode or two-wheel-drive mode.

As an alternative to having a manually actuated selection device, such as the selection device 67, a vehicle may be an all-wheel-drive vehicle, wherein the operator does not have the option to manually choose the driving mode. In any case, the present invention includes a system and method for automatically disconnecting at least one of the drive wheels from the vehicle powertrain under certain vehicle conditions—even if the four-wheel-drive mode is selected, or the vehicle is all-wheel-drive. As explained in conjunction with FIG. 2, the vehicle 10 includes one or more disconnects operable to disconnect the secondary drive wheels 66 from the powertrain. The secondary drive wheels 66 may be the front or rear wheels of the vehicle 10, as the present invention includes applications where either the front or rear axle can be disconnected from the powertrain.

In addition to the vehicle arrangement shown in FIG. 1, other vehicle arrangements are included within the present invention. For example, the secondary drive wheels 66 could be driven by electric motor arrangements other than the motor 60. In one embodiment, the secondary drive wheels 66 may be independently driven by electric motors directly attached to the wheels; alternatively, one or more motors could be attached to the second axle 64. It is understood that the second axle 64 may comprise two axle half-shafts, rather than a single shaft connecting the two wheels. In embodiments having a separate motor or motors to drive a second set of wheels—for example, the motor 60 and secondary drive wheels 66—the powertrain connected to the primary drive wheels may be of a conventional type—i.e., having only an internal combustion engine, rather than a hybrid powertrain, such as shown in FIG. 1.

Figure 2:
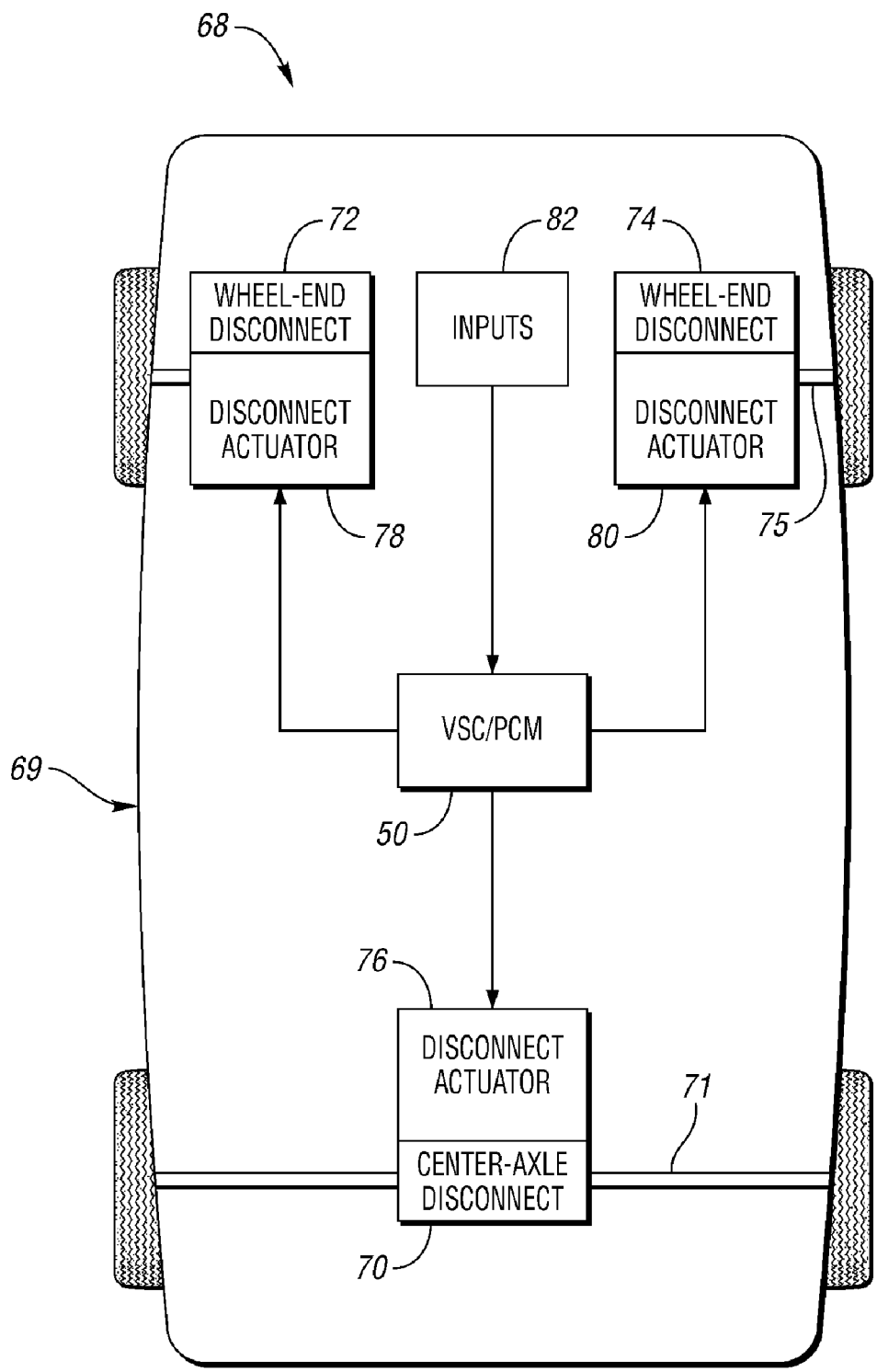
FIG. 2 is a schematic representation of a system in accordance with one embodiment of the present invention.

FIG. 2 shows a schematic representation of a system 68 in accordance with the present invention. A vehicle 69 includes both a center axle disconnect 70 on a first axle 71, and wheel end disconnects 72, 74, on a second axle 75. For purposes of the present invention, it is not necessary to have disconnects on both axles of a vehicle. For example, the vehicle 10, shown in FIG. 1, may have a disconnect or disconnects on the second axle 64, and none on the first axle 56. FIG. 2 illustrates two different types of disconnects that could be used on a vehicle. Either type could be used on only one of a vehicle's axles, on both of the axles, or as shown in FIG. 2, a vehicle may have one type of disconnect on one axle and another type on the other axle.

Of course, it is not necessary to locate disconnects at the vehicle axles. For example, a disconnect may be located in or near a transfer case, or at any other location where it is effective to disconnect one or more of wheels from the vehicle powertrain. Each of the axle disconnects 70, 72, 74 includes a respective disconnect actuator 76, 78, 80 which, for example, may be controlled with an electric signal or pneumatic pressure. As shown in FIG. 2, one or more inputs, represented by block 82, are received by the VSC/PCM 50, which then controls the disconnect actuators 76, 78, 80 in accordance with the information it receives.

The disconnects 70, 72, 74 may be configured to operate in a manner known to those skilled in the art. One such set of disconnects is described in U.S. Pat. No. 6,793,034 issued to Raftari et al. on 21 Sep. 2004, which is hereby incorporated herein by reference. A motor, for example, the motor 60 shown in FIG. 1, may be used to synchronize the wheel speed with the vehicle speed prior to connecting the wheels 66 to the powertrain. This eliminates the need to have synchronized disconnects, and allows less complex, non-synchronized disconnects—e.g., dog clutches—to be used.

As described above, the ability to selectively disconnect one of the axles from the powertrain in a vehicle that would otherwise be operating in a four-wheel-drive mode, can increase fuel economy. Similarly, connecting an axle to the powertrain of a vehicle that would otherwise be operating in a two-wheel-drive mode can increase the regenerative braking energy captured during a braking event. Thus, the present invention includes a system and method for controlling the powertrain automatically—i.e., without requiring manual driver selection—to selectively connect and disconnect drive wheels to and from the powertrain.

FIG. 3 shows a flow chart 84 illustrating a method of the present invention. The flow chart 84 shows a discrete starting point at block 86. The method illustrated in FIG. 3, and other methods in accordance with the present invention, may operate at all times while the vehicle is running, or alternatively, may be configured to operate only under certain vehicle conditions. The method illustrated in FIG. 3 is a type of control strategy, which may reside as software in a controller, such as the VSC/PCM 50. Alternatively, portions of the control strategy could reside in different controllers that communicate with each other, for example, via a CAN, such as the CAN 52 shown in FIG. 1.

The control strategy uses a number of inputs, shown at block 82, which may relate to one or more vehicle conditions. Using the vehicle 10 in FIG. 1 as a reference, the vehicle conditions may include such variables as the speed of the vehicle 10, a state of charge (SOC) of the battery 46, and whether a four-wheel-drive or two-wheel-drive mode has been selected by the vehicle operator using the selection device 67. In the case where a vehicle is an all-wheel drive, or full-time four-wheel-drive vehicle, the strategy can be executed as though a selection device was used to place the vehicle in a four-wheel-drive mode.

In the embodiment shown in FIG. 3, the first vehicle condition that is examined is the speed of the vehicle. The speed of the vehicle may be determined by any convenient method, such as direct measurement, or it may be inferred from other known conditions. Once it is determined, the speed of the vehicle is compared to a predetermined condition, such as whether the speed is above a certain threshold—see decision block 88. The predetermined condition, such as the speed threshold, may be a single discrete value to which the determined vehicle speed is compared.

Alternatively, a predetermined condition, such as the speed threshold, may not be a discrete value, but rather, a calibratable value based on a control hysteresis, such as "time at speed" or other similar criteria. The use of such techniques is well known to those familiar with control strategy, and helps to avoid undesirable fluctuations resulting from acting upon transient responses. One of the reasons that the vehicle speed may be used as one of the vehicle conditions, is that at higher speeds, the vehicle is less likely to require four-wheel-drive, and is also less likely to experience a braking event where regenerative braking energy could be captured. At lower vehicle speeds, the converse is true.

Returning to FIG. 3, it is shown that if the speed of the vehicle is above the threshold, another vehicle condition is examined: specifically, whether the vehicle is in a two-wheel-drive mode—see decision block 90. If the vehicle is in a two-wheel-drive mode, a secondary axle, for example, the second axle 64 shown in FIG. 1, is disengaged from the powertrain—see step 92. Of course, it is assumed that the secondary axle is engaged prior to step 92, for if it is already disengaged, the method loops back to block 82.

If, at decision block 90, it is determined that the vehicle is not in the two-wheel-drive mode—this can include either a manual selection of a four-wheel-drive mode or an all-wheel-drive/full-time four-wheel-drive vehicle—then it may be desirable to engage the second axle if it is not already engaged. In one embodiment, for example, it may be desirable to keep the secondary axle disengaged if the vehicle speed is above the speed threshold regardless of whether the vehicle is in a two-wheel drive or four-wheel-drive mode. In the embodiment shown in FIG. 3, however, an additional vehicle condition is examined. In particular, at decision block 94, it is determined whether the vehicle is driving on a surface having a coefficient of friction ($\mu$) less than some predetermined coefficient of friction. Again, the control strategy may require that the determined coefficient of friction be less than the predetermined value for some period of time before a "yes" answer is output.

Examining the coefficient of friction in addition to the speed of the vehicle provides the advantage of taking into consideration the benefit of having four-wheel-drive operation when the road surface is slippery, even if the vehicle is traveling at high speeds. As with the determination of the vehicle speed, the determination of the coefficient of friction between the vehicle wheels and the road surface can be determined by any of a number of methods, or by some combination of methods utilizing fuzzy logic to account for a number of inputs.

One method would be to determine the amount by which the secondary axle speed deviates from the first, or primary, axle speed. If the deviation is more than a calibratable threshold, which could vary as a function of the vehicle speed, a low coefficient of friction could be indicated. Alternatively, the rate of acceleration of wheels, given the input torque, would be another method to determine the coefficient of friction. Other methods may include examining the speed of the wheels versus the longitudinal acceleration of the vehicle, and/or determining whether ambient temperature is below a threshold, which would indicate conditions favorable for the formation of ice on the road.

If at decision block 94, it is determined that the road surface does not have a low coefficient of friction, the secondary axle is disengaged at step 92, unless it is already disengaged, in which case the method loops back to block 82. Conversely, if a low coefficient of friction road surface is determined, the secondary axle is engaged at step 96. Of course, this assumes that the secondary axle is disengaged, otherwise the method loops back to block 82. If a vehicle, such as the vehicle 10 shown in FIG. 1, is on a low friction surface, stability and/or traction systems may engage prior to engaging the secondary axle. This helps to ensure that the vehicle is stable—e.g., not skidding—and also helps to ensure that both sets of wheels are at approximately the same speed before the secondary axle is engaged.

Thus, in the first part of the method illustrated in the flow chart 84, it is shown that having the speed of the vehicle above a predetermined speed threshold will typically result in the vehicle being operated in a two-wheel-drive mode in order to increase fuel economy. The present invention, however, provides an exception to this by determining the coefficient of friction of the road surface, which will help ensure that the vehicle operator has the advantages of four-wheel-drive operation during times when it is most needed.

Returning to decision block 88, it is shown that even if the speed of the vehicle is not above the predetermined speed threshold, the strategy still determines whether the vehicle is operating in the two-wheel-drive mode—see decision block 98. In general, if the speed of the vehicle is not above the predetermined speed threshold, it will be desirable to engage the secondary axle. This is because at low vehicle speeds, a braking event is more likely, and having the secondary axle engaged will help to maximize the amount of regenerative braking energy captured. Thus, if at decision block 98 it is determined that the vehicle is not in two-wheel-drive mode, the secondary axle will be engaged at step 96.

In the embodiment shown in FIG. 3, additional inquiries are made if, at decision block 98, it is determined that the two-wheel-drive mode has been selected for the vehicle. For example, at decision block 100, the state of the charge (SOC) of a battery, such as the battery 46 shown in FIG. 1, is determined. The SOC of the battery is then compared to a predetermined state of charge threshold which, like the other thresholds, may require that a predetermined value be maintained for a certain period of time, that may further include a hysteresis to avoid fluctuations.

An examination of the battery SOC can be beneficial, in that there may be times when the capture of regenerative braking energy is not desired. For example, if the battery SOC is not above the predetermined threshold, then capturing regenerative braking energy may be important and the method moves to step 96 where the secondary axle is engaged. Conversely, if the battery SOC is above the SOC threshold, it may not be desirable to input the regenerative braking energy into the battery, since this could cause the battery to overcharge. Thus, in this situation, regenerative braking energy that is captured would need to be dissipated, and would therefore be lost. At this point, one embodiment of the present invention might automatically disengage the secondary axle so that the capture of regenerative braking energy is inhibited. In the embodiment shown in FIG. 3, however, an additional parameter is examined, thereby providing additional benefits.

If, at decision block 100, it is determined that the battery SOC is above the predetermined SOC threshold, it is next determined at decision block 102 whether the vehicle is being operated in a city driving mode. The city driving mode may be characterized by any one of, or a combination of, a number of parameters. For example, determining the number of times the vehicle speed increases and decreases by a calibratable amount over a calibratable period of time while the vehicle speed or average vehicle speed stays below a calibratable threshold, can be used to indicate whether the vehicle is operating in a city driving mode. Frequent stops and starts and increases and decreases in vehicle speed are indicative of city driving.

Other ways in which a city driving mode can be detected include a determination of the number of times the battery SOC increases and decreases by a calibratable amount over a calibratable period of time. The primary torque producer in a city driving mode may be the electric motor, which will cause the battery SOC to decrease. Conversely, braking events are frequent during city driving, which would cause the battery SOC to increase. Thus, measured fluctuations in the SOC in a relatively short period of time would provide a good indicator that the vehicle is being driven in a city environment.

Other factors which could be used include electric drive energy dissipation over a calibratable period of time—i.e., integration of battery output over time. In addition, for vehicles equipped with a global positioning system (GPS), the GPS information could be used to determine when the vehicle is being driven in a city environment. If it is determined that the vehicle is driving in a city driving mode, the otherwise expected control strategy of disengaging the secondary axle to avoid capturing unwanted regenerative braking energy may be overridden. This is shown in the flow chart 84 in FIG. 3, where a "yes" answer in decision block 102 leads to step 96 where the secondary axle is engaged. One reason for having this built-in exception to override a high battery SOC determination, is that it is possible that in city driving, the battery SOC may fluctuate frequently over a relatively short period of time, leading to excessive cycling in the engagement and disengagement of the secondary axle.

If, after a city driving mode is detected, the detection criteria have not indicated city driving cycle conditions for a calibratable period of time, the system would again allow disengagement of the secondary axle at low speeds and high battery SOC's. As shown in FIG. 3, if, at decision block 102, it is determined that a city driving mode has not been detected, the method loops back to step 92, where the secondary axle is disengaged. It is worth noting that although the various decision blocks are shown sequentially in the flow chart 84, in practice, a control system may evaluate multiple parameters simultaneously, and updates to the values of the various vehicle conditions may occur at some predetermined frequency, so that the control system and strategy act on current vehicle operating conditions.

While the best mode for carrying out the invention has been described in detail, those familiar with the art to which this invention relates will recognize various alternative designs and embodiments for practicing the invention as defined by the following claims.

What is claimed:

1. A method for managing a powertrain in a vehicle including a front drive wheel, a rear drive wheel, and an electric motor arrangement operable to supply torque to at least one of the drive wheels, the vehicle including a power supply for storing electrical energy and for providing electrical energy to the motor arrangement, the vehicle being operable in at least a first driving mode in which the front and rear drive wheels are selected to drive the vehicle, at least one of the drive wheels having a changeable connection status to the powertrain such that it is selectively connectable to and disconnectable from the powertrain, the method comprising:

determining a speed of the vehicle;

comparing the speed of the vehicle to a predetermined speed threshold;

connecting one of the front drive wheel or the rear drive wheel to the powertrain when the speed of the vehicle is not above the predetermined speed threshold, the vehicle is operating in the first driving mode, and the at least one drive wheel is not connected to the powertrain, thereby connecting both the front drive wheel and the rear drive wheel to the powertrain; and determining if the vehicle is being operated in a city driving mode characterized by at least one of a predetermined number of speed changes of the vehicle over time, changes in a state of charge of the power supply over time, a function of power supply output over time, or vehicle position information, and disconnecting the at least one drive wheel from the powertrain when the speed of the vehicle is not above the predetermined speed threshold, the vehicle is not operating in the first driving mode, a state of charge of the power supply is above a predetermined state of charge threshold, the vehicle is not being operated in the city driving mode, and the at least one drive wheel is connected to the powertrain.

2. The method of claim 1, further comprising disconnecting the at least one drive wheel from the powertrain when the speed of the vehicle is above the predetermined speed threshold, the vehicle is not operating in the first driving mode, and the at least one drive wheel is connected to the powertrain.

3. The method of claim 1, further comprising connecting the at least one drive wheel to the powertrain when the speed of the vehicle is above the predetermined speed threshold, the vehicle is operating in the first driving mode, the vehicle is operating on a surface having a coefficient of friction less than a predetermined coefficient of friction, and the at least one drive wheel is not connected to the powertrain.

4. The method of claim 1, further comprising connecting the at least one drive wheel to the powertrain when the speed of the vehicle is not above the predetermined speed threshold, the vehicle is not operating in the first driving mode, a state of charge of the power supply is not above a predetermined state of charge threshold, and the at least one drive wheel is not connected to the powertrain.

5. The method of claim 1, further comprising
connecting the at least one drive wheel to the powertrain when the speed of the vehicle is not above the predetermined speed threshold, the vehicle is not operating in the first driving mode, a state of charge of the power supply is above a predetermined state of charge threshold, the vehicle is being operated in the city driving mode, and the at least one drive wheel is not connected to the powertrain.

6. A method for managing a powertrain in a vehicle, the powertrain including an electric motor arrangement operable to provide torque to at least a first pair of drive wheels proximate one end of the vehicle, the vehicle including a second pair of drive wheels proximate another end of the vehicle, the second pair of drive wheels having a changeable connection status to the powertrain such that it is selectively connectable to and disconnectable from the powertrain, the vehicle further including a selection device for selectively placing the vehicle in a four-wheel-drive mode or a two-wheel-drive mode, and a power supply for storing electrical energy and for providing electrical energy to the motor arrangement, the method comprising:

determining a speed of the vehicle;
determining whether the selection device is in the two-wheel-drive mode or the four-wheel-drive mode;
disconnecting the second pair of drive wheels from the powertrain when it is determined that the speed of the vehicle is above a predetermined speed threshold, the selection device is in the two-wheel-drive mode, and the second pair of drive wheels is connected to the powertrain;
connecting the second pair of drive wheels to the powertrain when the speed of the vehicle is not above the predetermined speed threshold, the selection device is in the four-wheel-drive mode, and the second pair of drive wheels is not connected to the powertrain;

connecting the second pair of drive wheels to the powertrain when the speed of the vehicle is not above the predetermined speed threshold, the selection device is in the two-wheel-drive mode, a state of charge of the power supply is not above a predetermined state of charge threshold, and the second pair of drive wheels is not connected to the powertrain;

determining whether the vehicle is being operated in a city driving mode, the city driving mode being characterized by at least one of a predetermined number of speed changes of the vehicle over time, changes in a state of charge of the power supply over time, a function of power supply output over time, or vehicle position information;

connecting the second pair of drive wheels to the powertrain when the speed of the vehicle is not above the predetermined speed threshold, the selection device is in the two-wheel-drive mode, a state of charge of the power supply is above a predetermined state of charge threshold, the vehicle is being operated in the city driving mode, and the second pair of drive wheels is not connected to the powertrain; and disconnecting the second pair of drive wheels from the powertrain when the speed of the vehicle is not above the predetermined speed threshold, the selection device is in the two-wheel-drive mode, a state of charge of the power supply is above a predetermined state of charge threshold, the vehicle is not being operated in the city driving mode, and the second pair of drive wheels is connected to the powertrain.

7. The method of claim 6, further comprising:
determining a coefficient of friction between the vehicle and a road surface;
disconnecting the second pair of drive wheels from the powertrain when the speed of the vehicle is above the first predetermined speed threshold, the selection device is in the four-wheel-drive mode, the coefficient of friction is not less than a predetermined coefficient of friction, and the second pair of drive wheels is connected to the powertrain; and
connecting the second pair of drive wheels to the powertrain when the speed of the vehicle is above the first predetermined speed threshold, the selection device is in the four-wheel-drive mode, the coefficient of friction is less than a predetermined coefficient of friction, and the second pair of drive wheels is not connected to the powertrain.

8. A system for managing a powertrain in a vehicle, the powertrain including an electric motor arrangement operable to provide torque to at least a first drive wheel proximate one end of the vehicle, the vehicle including a second drive wheel proximate another end of the vehicle, and a power supply for storing electrical energy and for providing electrical energy to the motor arrangement, the vehicle being operable in at least a first driving mode in which the first and second drive wheels are selected to drive the vehicle, the system comprising:

a disconnect disposed between the second drive wheel and the powertrain and operable to selectively connect the second drive wheel to, and disconnect the second drive wheel from, the powertrain; and a control system including at least one controller, the control system being in communication with the disconnect, the control system being configured to determine a speed of the vehicle and whether the vehicle is operating in the first driving mode, and further configured to effect operation of the disconnect to connect the second drive wheel to the powertrain when the speed of the vehicle is not above a predetermined speed threshold, the vehicle is operating in the first driving mode, and the second drive wheel is not connected to the powertrain, the control system being further configured to:

effect operation of the disconnect to connect the second drive wheel to the powertrain when the speed of the vehicle is not above a predetermined speed threshold, the vehicle is not operating in the first driving mode, a state of charge of the power supply is not above a predetermined state of charge threshold, and the second drive wheel is not connected to the powertrain, receive signals related to whether the vehicle is operating in a city driving mode, the city driving mode being characterized by at least one of speed changes of the vehicle over time, changes in a state of charge of the power supply over time, a function of power supply output over time, or vehicle position information, effect operation of the disconnect to connect the second drive wheel to the powertrain when the speed of the vehicle is not above a predetermined speed threshold, the vehicle is not operating in the first driving mode, a state of charge of the power supply is above a predetermined state of charge threshold, the vehicle is being operated in the city driving mode, and the second drive wheel is not connected to the powertrain, and effect operation of the disconnect to disconnect the second drive wheel from the powertrain when the speed of the vehicle is not above a predetermined speed threshold, the vehicle is not operating in the first driving mode, a state of charge of the power supply is above a predetermined state of charge threshold, the vehicle is not being operated in the city driving mode, and the second drive wheel is connected to the powertrain.

9. The system of claim 8, wherein the control system is further configured to receive signals related to a coefficient of friction between the vehicle and a road surface, and to effect operation of the disconnect to disconnect the second drive wheel from the powertrain when the speed of the vehicle is above a predetermined speed threshold, the vehicle is operating in the first driving mode, the coefficient of friction is not less than a predetermined coefficient of friction, and the second drive wheel is connected to the powertrain.

10. The system of claim 9, wherein the control system is further configured to effect operation of the disconnect to connect the second drive wheel to the powertrain when the speed of the vehicle is above a predetermined speed threshold, the vehicle is operating in the first driving mode, the coefficient of friction is less than a predetermined coefficient of friction, and the second drive wheel is not connected to the powertrain.

* * * * *